United States Patent [19]

Brasz et al.

[11] 4,409,164

[45] Oct. 11, 1983

[54] PROCESS OF MAKING PRODUCTS CONSISTING OF FOAMED AND/OR CROSS-LINKED SYNTHETIC POLYMERS

[75] Inventors: Albert J. H. Brasz, Born, Netherlands; Hermanus A. Wallink, Selfkant, Fed. Rep. of Germany

[73] Assignee: Stamicarbon, B.V., Geleen, Netherlands

[21] Appl. No.: 247,546

[22] Filed: Mar. 25, 1981

[30] Foreign Application Priority Data

Mar. 25, 1980 [NL] Netherlands .......................... 8001732

[51] Int. Cl.³ .......................... B29D 27/00; B29F 3/02
[52] U.S. Cl. .......................... 264/50; 264/53; 264/54; 264/68; 264/176 R; 264/211; 264/DIG. 18; 425/46; 425/208; 425/209; 425/817 C
[58] Field of Search .......................... 264/51, 53, 54, 45.9, 264/DIG. 18, 50, 68, 176 R, 211; 425/4 C, 208, 209, 817 C

[56] References Cited

U.S. PATENT DOCUMENTS

| | | | |
|---|---|---|---|
| 3,026,272 | 3/1962 | Rubens et al. | 264/53 X |
| 3,250,731 | 5/1966 | Buhl et al. | 264/DIG. 18 |
| 3,287,477 | 11/1966 | Vesilind | 264/53 |
| 3,452,123 | 6/1969 | Beckmann et al. | 264/DIG. 18 |
| 3,523,988 | 8/1970 | Roehr et al. | 264/53 X |
| 3,586,645 | 6/1971 | Granger et al. | 264/51 X |
| 3,787,542 | 1/1974 | Gallagher et al. | 264/53 X |
| 3,843,757 | 10/1974 | Ehrenfreund et al. | 264/53 |
| 4,107,260 | 8/1978 | Dougherty | 264/45.9 X |
| 4,218,146 | 8/1980 | Inge Housz | 366/78 |
| 4,289,716 | 9/1981 | Voigt | 264/54 X |
| 4,302,409 | 4/1981 | Miller et al. | 264/50 X |

FOREIGN PATENT DOCUMENTS 1303643 1/1973 United Kingdom ................. 264/68

Primary Examiner—Philip E. Anderson

[57] ABSTRACT

A process is described for improving the rate of production, other conditions being equal, of extruded polymer products, containing foaming- and/or cross-linking agents, which particularly resides in using a "melting torpedo" rotatable element in the melting section of the extrusion apparatus.

12 Claims, 3 Drawing Figures

PROCESS OF MAKING PRODUCTS CONSISTING OF FOAMED AND/OR CROSS-LINKED SYNTHETIC POLYMERS

This invention relates to a process of making products consisting of foamed and/or cross-linked synthetic polymers or products consisting of synthetic polymers in which foaming and/or cross-linking can be induced, in which process use is made of a polymer-processing machine equipped with a screw to distribute, or effect further distribution of, foaming and/or cross-linking agents in the polymer.

This process can be carried out, for instance, in a screw extruder. In a screw extruder, the material to be extruded is passed from a feed hopper to the exit, through a transport zone, a melting zone, possibly a dispersion zone, and a homogenization zone. The shape of the exit aperture determines the shape of the extrudate. This extrudate shape may, further, correspond to the desired shape of the final product, but may also serve as a starting shape for treatments following that in the extruder.

In most cases, the material processed in an extruder undergoes a rise in temperature in the transport zone, with a peak temperature occurring in the melting zone or, if used, the dispersion zone, after which a decrease to a lower temperature may set in as the material passes on towards the exit. The temperature immediately ahead of the exit is here called to the melt-end temperature. In the exit aperture the temperature rises again to the so-called exit temperature at which the material issues from the extruder.

The heat required for melting is obtained by heat supply through the wall and/or by dissipation within the material of heat generated as a result of the mechanical work applied to the material by the screw. To this end, the screw generally has, in the melting zone, such as geometry that the generation of heat is promoted. The decrease in temperature which may occur after the melting zone or the dispersion zone is effected through heat release through the wall. The renewed rise in temperature of the material in the exit aperture is effected by heat dissipation. This dissipation of heat, and hence the rise in temperature, is higher as the rate at which the material is forced through the exit aperture is higher. The exit temperature is, therefore, determined by the melt-end temperature and the production rate.

Several methods are known for adding to the polymer material substances as are required for foaming and/or cross-linking. Generally speaking, the foaming and/or cross-linking agents can be added to the material before, during or after the melting phase, depending on the conditions and the nature of agent. Sometimes a combination of these methods may be used.

If a foaming and/or cross-linking agent can be applied before melting, this is mostly done by impregnation, wetting, mixing of the polymer with the agent, or by separate simultaneous supply of the polymer and the agent to, for instance, the feed hopper or directly onto the extruder screw. However, if the choice is for addition of the agent during or after the melting phase, the agent is added to the material at one or more injection points in the melting zone (see, numerals 25 and 25' in FIG. 1 and FIG. 3, respectively) or at one or more injection points in the zone(s) following the melting zone (see, numerals 30 and 30' in FIG. 1 and FIG. 3, respectively).

Foaming agents include chemically-active and physically-active foaming agents.

Physically-active foaming agents are substances which are in the gaseous or the liquid state at normal temperature and pressure. In the extruder they are present under such conditions of temperature and pressure that they cannot cause foaming of the melt there. Only when the pressure decreases during and after the exit from the exit aperture do the gases, or the liquid vapors formed, expand, which causes the melt to be foamed. The range of physically-active foaming agents includes, i.e., alkanes, e.g., n-pentane, isopentane, hexane, heptane, octane; halogenated hydrocarbons, such as methylenechloride, trichlorofluoromethane, dichlorodifluoromethane, trichlorotrifluoroethane, dichlorotetrafluoroethane, dichloroethane, chlorodifluoroethane and tetrafluoroethane; inert gases such as nitrogen, carbon dioxide and ammonia. Sometimes water is employed.

Chemically-active foaming agents generate a gas at an accelerated rate upon reaching their so-called decomposition temperature. Examples of chemically active foaming agents are azodicarbonamide, p-carbonethoxy-N-nitroso-N-methylbenzamide, azoisobutyronitrile, N,N-dinitrosopentamethylenetetramine, N-nitroso-N-alkylamides of aromatic dicarboxylic acids, bicarbonates, etc.

Cross-linking agents, which are here understood to include vulcanizing agents, are agents linking the polymer chains to a more or less three-dimensional network. Examples are peroxides such as dicumylperoxide, 2,5-dimethyl-2,5-di(tert.butylperoxy)hexane (LUPEROX 101), 2,5-dimethyl-2,5-di-(tert.butylperoxy)hexyne (LUPEROX 130), α-α-bis-(tert.butylperoxyisopropyl)-benzene (PERKODOX 14), tert.butylperbenzoate (TRIGONOX C), and di-tert.-butylperoxide (TRIGONOX B). Very suitable as vulcanizing agents are sulfur and sulfur compounds.

Various ways may be employed to eventually obtain foamed and/or cross-linked products. The aim may be to foam and/or cross-link the material immediately after extrusion; this will hereinafter be referred to as the direct foaming and/or cross-linking process. In other cases it may be the aim to delay foaming and/or cross-linking so as to be able, by applying an intermediate step in which a product is formed containing a foaming and/or a cross-linking agent, and to form the desired foamed and/or cross-linked product at a later stage, for instance, by the action of heat. This latter method will hereinafter be referred to as the delayed foaming and/or cross-linking process. This at first forms products such as granules, sheets or films, which can later be foamed or cross-linked.

In the direct foaming process carried out with a chemically-active foaming agent, it is necessary for the foaming agent to have decomposed to a considerable extent already before it enters the exit aperture. The remainder of the foaming agent decomposes in the exit aperture and possibly also after leaving this aperture. The material starts to be foamed only when it leaves the exit aperture at reduced pressure, which also happens if a physically-active foaming agent is used in a direct foaming process.

In the direct cross-linking process, a low degree of cross-linking already takes place before the melt enters the exit aperture, in dependence on the temperature and the residence time in the extruder. However, the cross-linking agent should have its highest activity only in and after leaving the exit aperture.

In the case of a delayed foaming and/or cross-linking process, the activity of the foaming and/or cross-linking agents used should be suppressed until the moment at which the resultant intermediate products need to be foamed and/or cross-linked.

In the direct foaming process, the issuing molten polymer mass must have a temperature at which the melt has the favorable elastic and viscous properties necessary for foaming. This means that on the one hand these properties must be such that the melt can expand under the influence of the expanding gas bubbles, whereas on the other hand the melt must not have so low a viscosity that the expanding gas breaks through the cell walls of the foam and escapes without effect, or that the foam breaks down before it has cooled sufficiently. The temperature rise in the exit aperture must, therefore, be limited, and hence also the production rate, as said above.

In the delayed foaming process, the foaming agent must not cause foaming of the melt up to the moment when the foamable intermediate product is completed. One thing this implies is that, here too, the temperature increase in the exit aperture should remain below a certain limit, thus, also, the production rate is bound to an upper limit.

In a delayed cross-linking process, the cross-linking agent must not exert more than a slight cross-linking effect on the polymer up to the moment the intermediate product amenable to cross-linking is completed. One thing this implies is that the cross-linking agent must constantly be kept at a temperature at which it can be only slightly active. Unduly high production rates cause too high a temperature rise in the exit aperture, so that, also here, the production rate is bound to a limit.

Although in the direct cross-linking process the production rate is not limited by the temperature rise in the exit aperture becoming too high for the cross-linking agent, it is nevertheless not possible to use an unlimited production rate, because if the temperature rise is too strong the polymer will come to exhibit unacceptable signs of degradation.

In summary, it may be stated that with the present state of the art in relation to the processes described above, there are, in one respect or another, limits to the production rate which are dependent upon the dissipation of heat in the exit aperture.

The present invention now provides a process for making products consisting of foamed and/or cross-linking synthetic polymers or products consisting of synthetic polymers that can be foamed or cross-linked, in which process a polymer processing machine equipped with a screw is used to distribute, or effect further distribution of, foaming and/or cross-linking agents in the polymer, and which process to a considerable extent overcomes with the disadvantages mentioned above.

The invention is characterized by the fact that the screw is provided, in the melting zone, with a melting torpedo as defined below.

The term "melting torpedo" is meant to signify a rotatable element used in screw-type extrusion devices for melting polymers, and consisting of a substantially cylindrical body on which there are, lengthwise, alternating grooves and ribs of such geometry that they form feed channels for the substance to be melted and discharge channels for the melt thus formed.

A device of this kind has become known from U.S. Pat. No. 4,218,146, the disclosure of which is incorporated herein by reference.

According to this application, such a device provides the opportunity to obtain a higher melt production per unit time. The device can be used in an extrusion machine as well as in the extruder section of an injection moulding machine. The grooves and ribs need not be disposed exactly lengthwise, i.e., at an angle of 90°, but may run at a lead angle of 45°–90°, by preference between 55° and 75°. The length of the cylindrical body is, for instance, 1–20 D, preferably 3–15 D, and in particular superior results are achieved with a length of 8–12 D, with D being the diameter of the screw.

Figure 1:
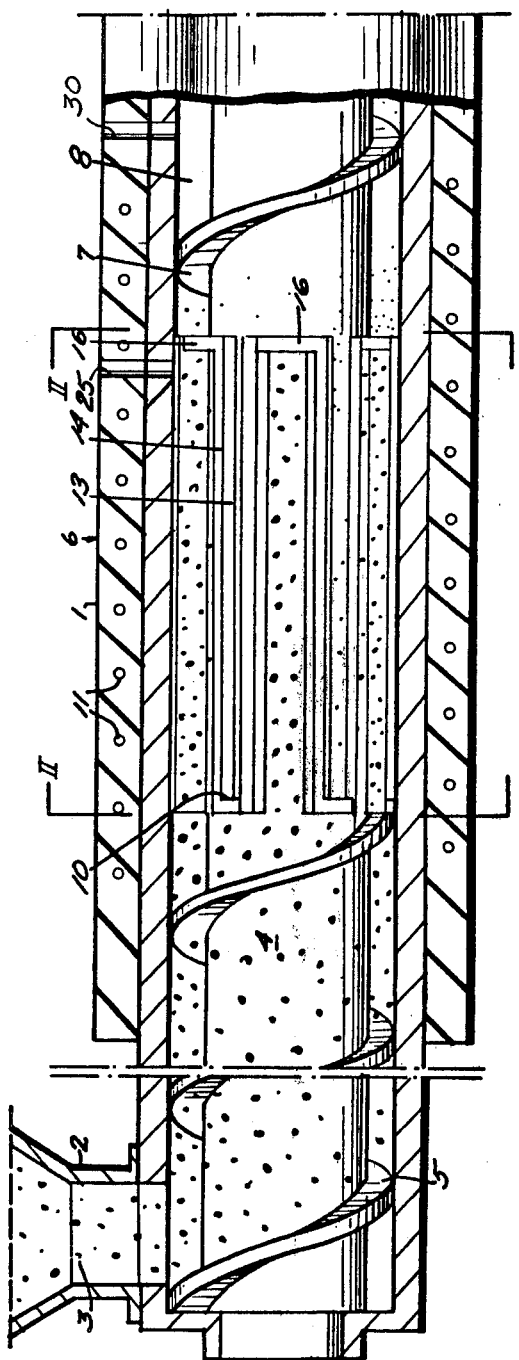
FIG. 1 is a diagrammatic longitudinal section of a part of an extruder with single start screw pump in which a melting section is provided.
Figure 2:
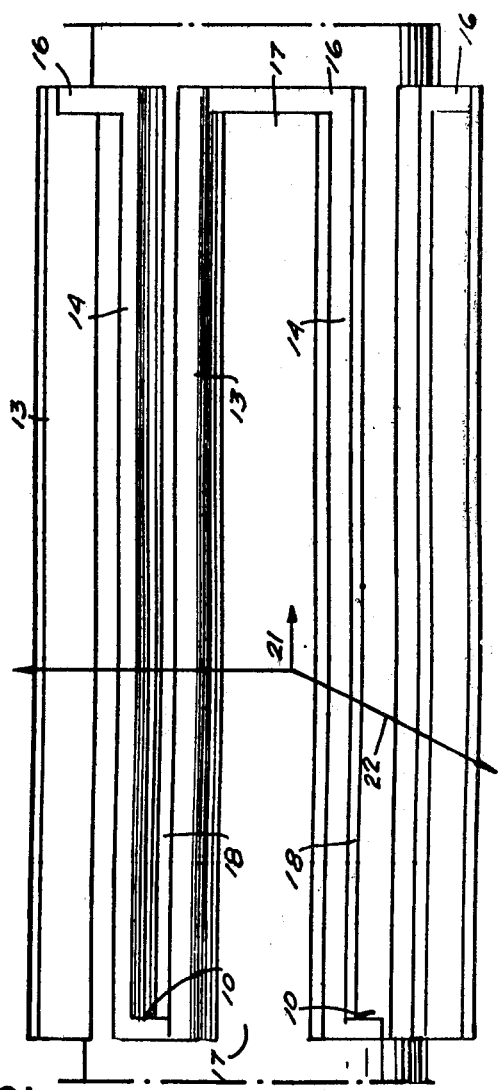
FIG. 2 is a representation on a larger scale of the parts lying within the area II of FIG. 1.
Figure 3:
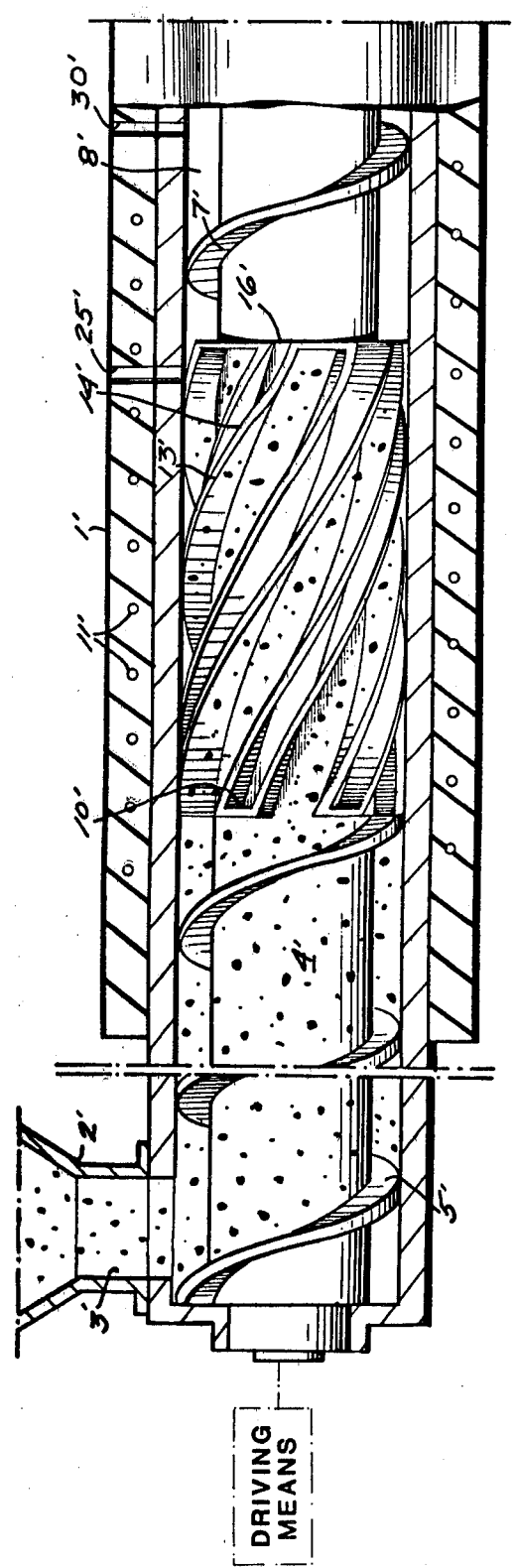
FIG. 3 is a diagrammatic longitudinal section of a part of an extruder with primes provided for reference numerals identifying features similar to those of FIG. 1 and showing helical ridges differing from the ridges of FIG. 1.

Referring now to the drawings in detail, FIGS. 1, 2 and 3 illustrate an extruder which consists primarily of a housing 1 with a feed hopper 2 for the granular thermoplastic 3, a body 4 rotatably mounted in said housing 1, and driving means for rotating said rotatable body 4. The left hand portion (with regard to FIG. 1) of the rotatable body 4 is formed by a screw pump of conveyor 5 in communication with the melting section 6, while the rotatable body 4 further continues in the form of a screw pump or conveyor 7 which transports the melt 8 under pressure to molding means not shown. The melting section 6 possesses heating means 11 around the housing 1. The rotatable body 4 is provided with alternating first ridges 13 and second ridges 14, interconnected by dams 10, 16 in such a way that wide inlet channels 17 and narrow discharge channels 18 are formed. The first ridges 13 leave such a gap with the inner surface of the housing that molten thermoplastic material cannot, or can only at a low rate, pass between a first ridge 13 and the inner surface of the housing 1. The second ridges 14 leave a gap with the inner surface of the housing 1, which gap is wider than that between the inner surface and the first ridges 13, so that the passage of molten material is possible but that practically a barrier is formed against the passage of unmolten material. The dams 10, 16 leave a gap with the inner surface of the housing 1 which is not larger than the gap of the second ridge 14. The entry channels 17 of the melting section 6 are open to the screw pump 5; the discharge channels 18 are open to the screw pump 7.

The operation of the apparaus is as follows: From the feed hopper 2, the granular thermoplastic material 3 drops into the screw pump or screw conveyor 5 which transports this material (see drawing) towards the right hand side. Over this transport section the housing 1 is not heated from the outside until in the proximity of the melting section 6, on the one hand in order to generate a high pressure in the solids material, on the other hand because it is desirable that the plug of the thermoplastic material 3 is fed into the melting section 6 surrounded by only a thin layer of melt. The granular material 3 is urged into the entrance channel 17 and there experiences the heat from the heating means 11 as well as the heat generated in the thin layer of melt 19 contiguous with the housing 1 by the relative motion between the thermoplastic material 3 and the housing 1. The thickness of the layer of melt 19 thereby increases in the direction of relative motion. The layer of melt 19 passes over the second ridge 14 to the extent that at the entrance of the material in the melting section sufficient melt has already been formed also over the dam 10. The plug of solid material 3 is pushed in the direction of the arrow 21 in FIG. 2; while further melting of this plug takes place, and the formed melt 8 flows over the second ridge 14 into the discharge channel 18 and, at the end of the inlet channel 17, over dam 16 directly to the screw pump 7 as well, whereupon melt 8 is taken up by the screw pump and transported further.

FIG. 2 shows the velocity vector 22 of the relative motion of the inner wall of housing 1 with reference to the plug of solid thermoplastic material 3.

FIG. 3 shows helical ridges 13', 14' following a screw path having a pitch angle within the range of 45° to 90° inclusive.

Although it cannot be understood why application of a device effecting increased melt production per unit time should lead to a higher production rate, in view of the limitation as regards the dissipation of heat in the exit aperture, it has, surprisingly, now been found that the abovementioned melting torpedo does make it possible to reach much higher production rates in the existing foaming and/or cross-linking processes—by an order of some tens of percent—under otherwise equal conditions as regards equipment, polymer and foaming and/or cross-linking agents. It is possible to obtain such products with equivalent or even improved properties. Why there should be this effect under circumstances that the exit temperatures are the same, as those used in conventional forming and or cross-linking processes is not clear at the present time.

Possibly, this special effect may be accounted for from a combination of factors exerting an influence, such as the temperature level of the resulting melt, the residence time, and the interaction between the melting torpedo and the screw sections following it, making it possible to obtain a lower melt end temperature. As a result, a higher dissipation of heat in the exit aperture can be allowed, and, as explained above, the production rate can therefore be increased. However, it is not known whether this explanation is indeed correct.

The invention will now be explained by means of some Examples.

EXAMPLE I

Experiment A

In a delayed cross-linking process in which low-density polyethylene (STAMYLAN 1520 SX of DSM) was supplied to the feed hopper of an extruder with a conventional screw (screw diameter 60 mm), together with 1.3% by weight of the peroxide PERKADOX 14 of AKZO, the exit temperature of the melt was controlled to 140° C. The product, coming available at the maximum rate of 43 kg/h, satisfied the quality requirements set. At higher production rates, however, the product was found to be non-homogeneous. Sometimes, the cross-linking proceeded in the extruder, so that stagnation occurred within the machine.

Experiment B

In the same extruder as used in Experiment A, this time, however, provided with a melting torpedo as described above, the same material could be processed, likewise at an exit temperature of 140° C., with a production rate of 64 kg/h to a product having the same properties as those obtained in Experiment A. This was a 49% increase in production rate.

EXAMPLE II

In a direct foaming process applied to polystyrene use was made of a physically-active foaming agent in the form of a mixture of 50% wt. FREON 11 (trichlorofluoromethane) and 50% wt. FREON 12 (dichlorodifluoromethane). The melt index of the polystyrene was 0.5 dg/min (190/2,16). The foaming agent was injected after the compression zone. Through the feed hopper citric acid and sodium carbonate were supplied as nucleators for the foam.

The mixing proportion was 100 parts by weight of polystyrene, 9 parts by weight of foaming agent, and 1 part by weight of citric acid and 1 part by weight of sodium bicarbonate.

Two Experiments Were Performed:

Experiment A

By means of a conventional extruder a maximum of 55 kg/h of foamed product could be obtained by controlling the exit temperature to 125° C. Attempts at higher production rates only resulted in higher exit temperatures, which meant that the melt did not have the correct viscous and elastic properties favorable for the foaming process, so that only poor and unsatisfactory quality was produced.

Experiment B

The extruder screw was provided, in the melting zone, with a melting torpedo. At an exit temperature of 125° C., a production rate of 87 kg/h of foamed product with a density of 60–70 kg/m$^3$ could be reached. This density was equivalent to that obtained in Experiment A at the same exit temperature (but a much lower production rate). The improvement in production rate was here 58%.

The above Examples show the great advantages achieved in the process according to the invention.

Production rate increases of the same order generally 25% or 40% or better have also been found realizable in combined foaming and cross-linking processes, in which the polymer is foamed as well as cross-linked.

It has also been found possible to obtain the same product specifications when the homogenization section of an extruder equipped with a melting torpedo was considerably shortened, so that the residence time of the polymer within the extruder could be reduced.

From investigations it has further appeared that notably in the direct and delayed cross-linking processes, the use of the melting torpedo, with retention of the rates conventionally used in the past has allowed a greater range of choice as to cross-linking agents, and to permit use of those which have the same half-life value at a lower temperature.

The invention disclosed herein is not limited to any particular polymer materials nor to any particular foaming or cross-linking agent.

What is claimed is:

1. In processes for the formation by extrusion of synthetic polymer products containing foaming and/or cross-linking agents using an extrusion machine equipped with screw means for effecting at least partial distribution of the foaming and/or cross-linking agents in the polymer composition during the extrusion process, the improvement consisting essentially in enhancing the rate of production of said foamable or cross-linkable products at a given extrusion exit temperature by providing and utilizing a modified screw means in the melting zone of the extrusion machine said modified screw means having a melting torpedo device incorporated therein, and extruding the said polymer composition at an extrusion rate higher than the maximum rate at which useful products can otherwise be obtained under otherwise equal conditions as regards the use of extrusion machines equipped with unmodified screw means, polymer material, foaming and/or cross-linking agents, and the exit temperatures employed.

2. Process according to claim 1, wherein the melting torpedo has grooves and ribs at a lead angle of between 45° and 90°.

3. Process according to claim 1, wherein the melting torpedo has grooves and ribs at a lead angle of between 55° and 75°.

4. Process according to claims 1, 2, or 3, wherein the length of the melting torpedo is between 3 D and 15 D.

5. Process according to claims 1, 2, or 3, wherein the length of the melting torpedo is between 8D and 12D.

6. Process according to claim 1, wherein in a direct foaming process a physically active foaming agent is used.

7. Process according to claim 1, wherein as foaming agent in a delayed foaming process a chemically active foaming agent is used.

8. Process according to claim 1, wherein as foaming agent in a direct foaming process a chemically active foaming agent is used.

9. Process according to claim 1, wherein as cross-linking agent in a direct cross-linking process a peroxide is used.

10. Process according to claim 1, wherein as cross-linking agent in a delayed cross-linking process a peroxide is used.

11. Process according to claim 1, wherein as cross-linking agent in a delayed cross-linking process sulfur or a sulfur compound is used.

12. Process according to claim 1, wherein in a cross-linking process use is made of a cross-linking agent consisting of a peroxide in which the usual half-life can be reached at lower temperature while maintaning the usual production rate and other conditions.

* * * * *